Aug. 4, 1942.　　　J. McGUIRE ET AL　　　2,292,280
RAKE LOADER
Filed Sept. 29, 1941　　　6 Sheets-Sheet 1
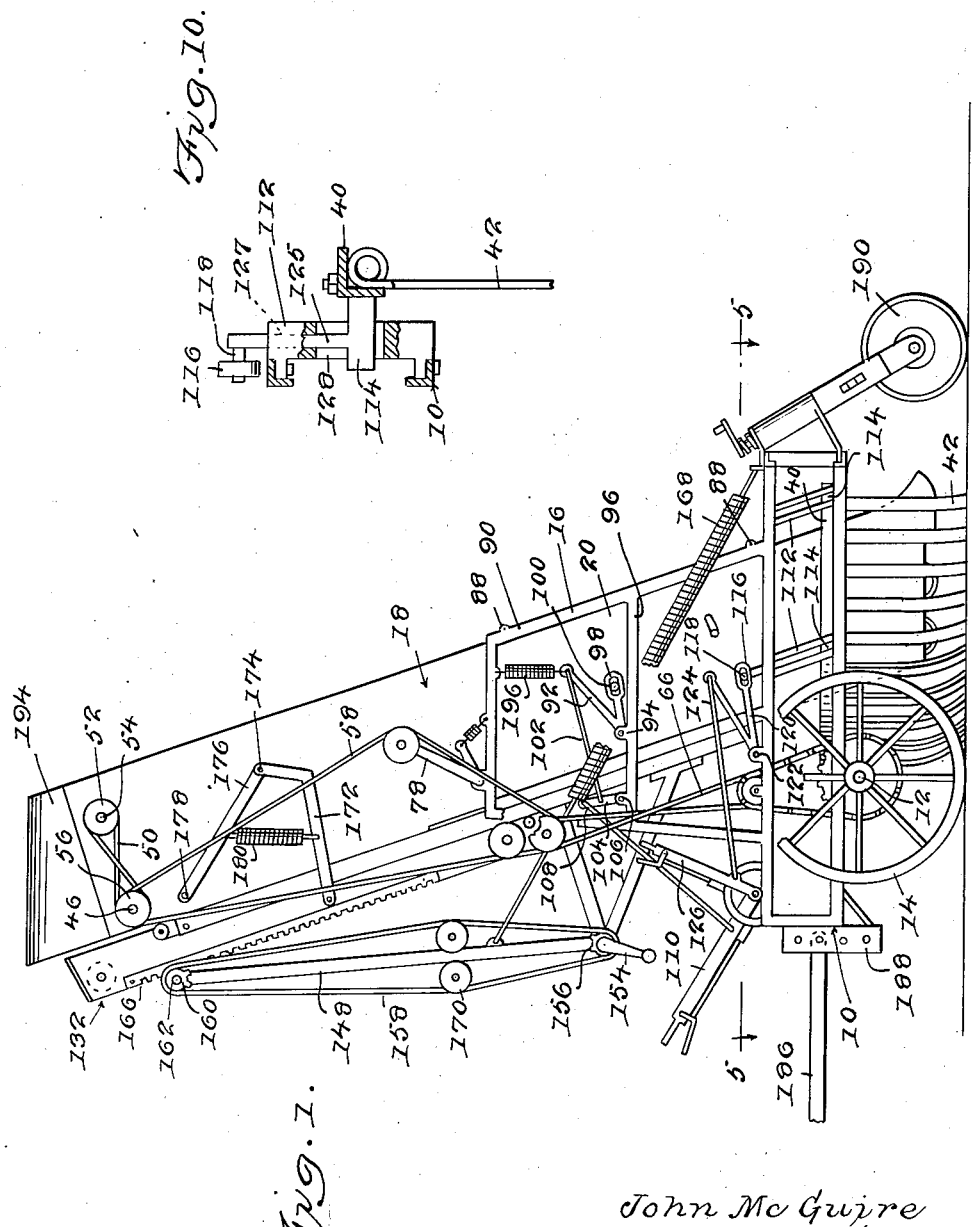
John McGuire
John R. McGuire
INVENTOR.
BY
Victor J. Evans & Co.
ATTORNEYS Aug. 4, 1942.   J. McGUIRE ET AL   2,292,280
RAKE LOADER
Filed Sept. 29, 1941   6 Sheets-Sheet 2

John McGuire
John E. McGuire
INVENTOR.

BY
Victor J. Evans & Co.
ATTORNEYS

Aug. 4, 1942.　　　J. McGUIRE ET AL　　　2,292,280
RAKE LOADER
Filed Sept. 29, 1941　　　6 Sheets-Sheet 3
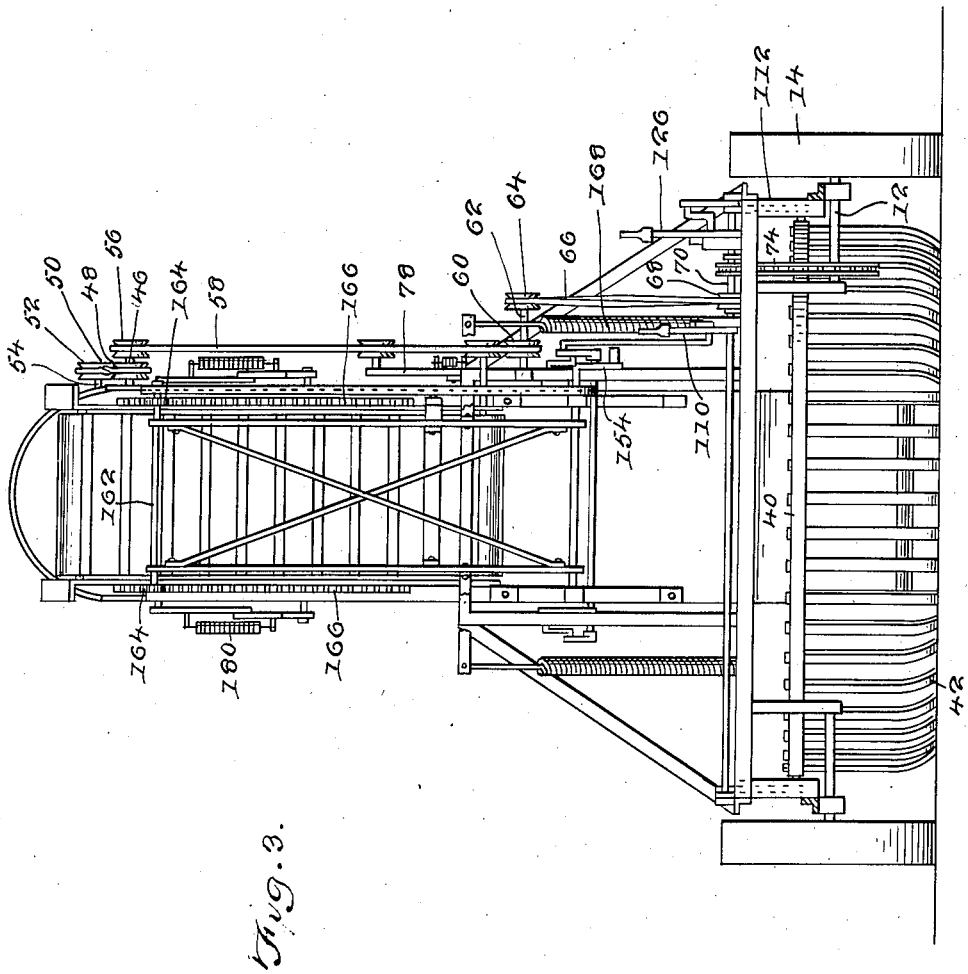
John Mc Guire
John R. McGuire
INVENTOR.
BY
Victor J. Evans & Co.
ATTORNEYS

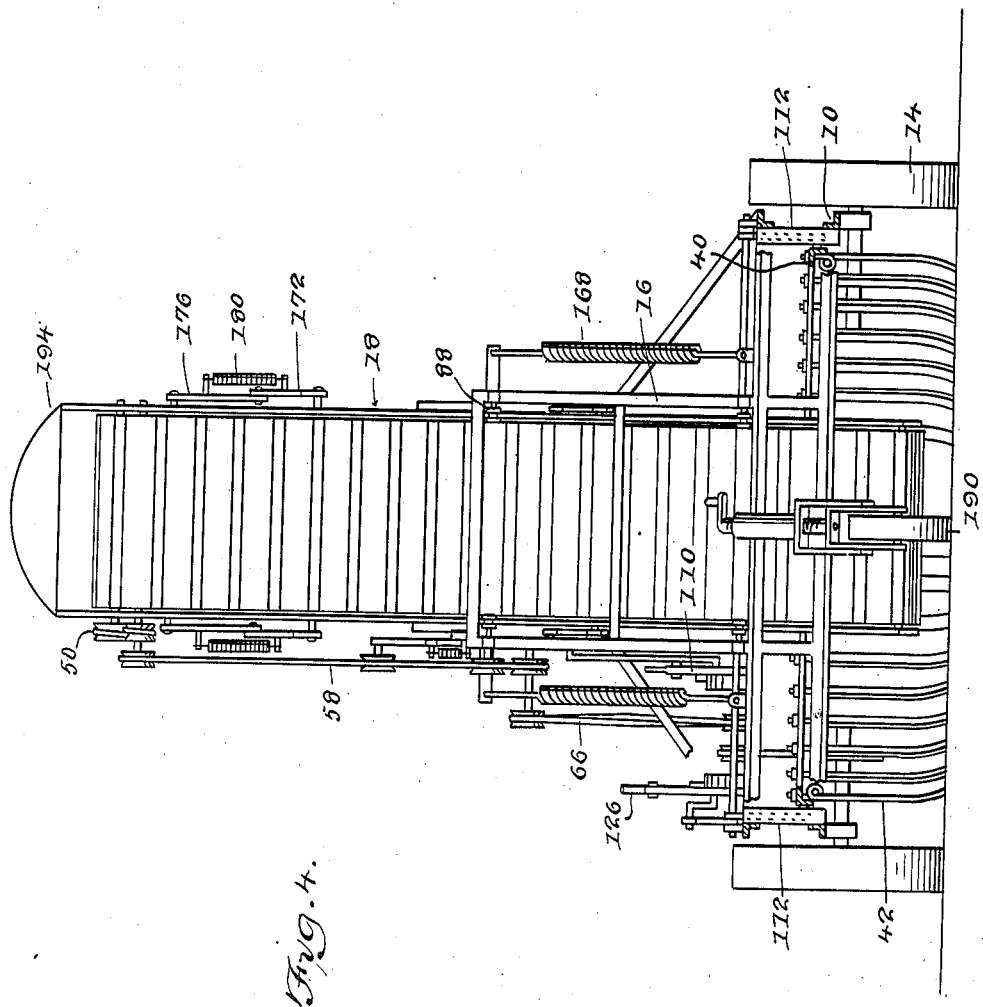

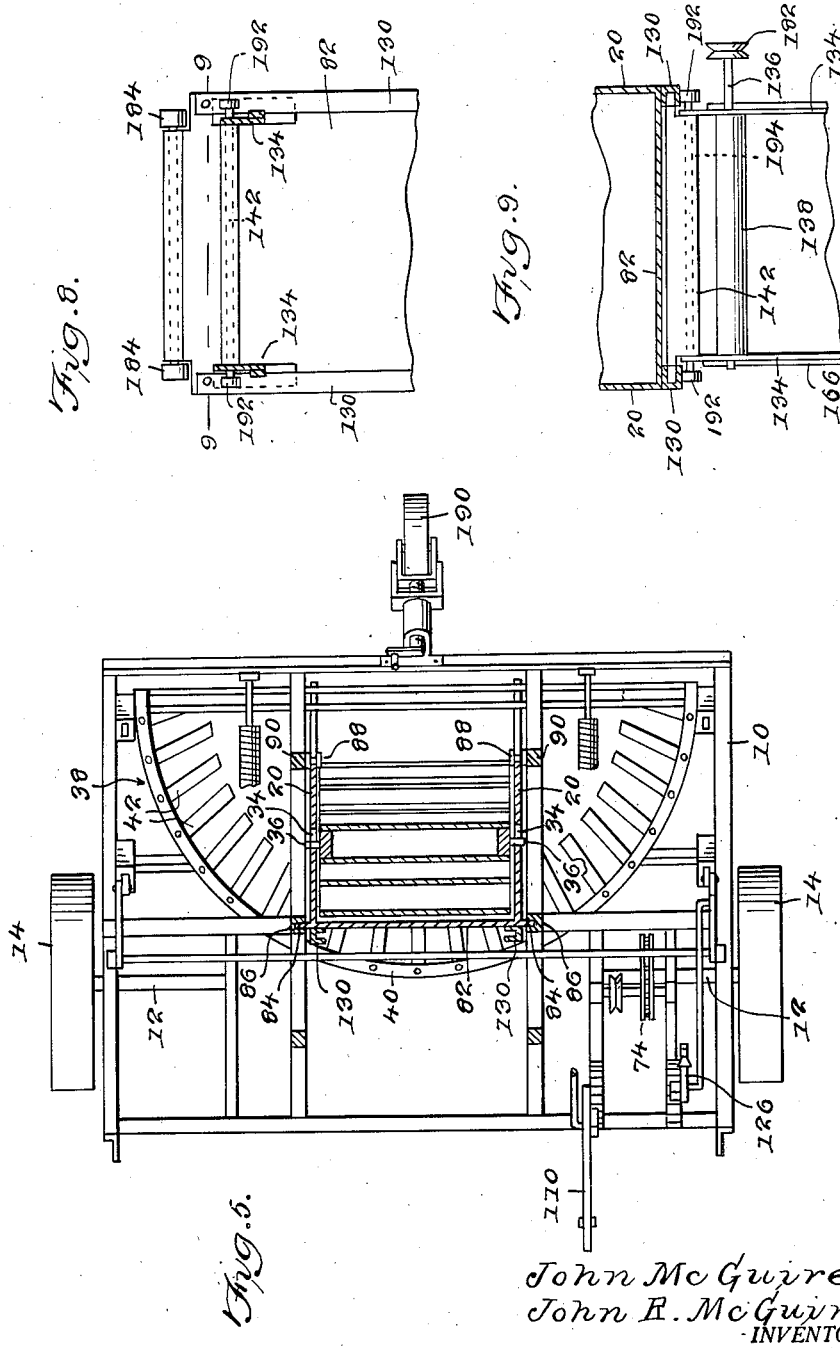

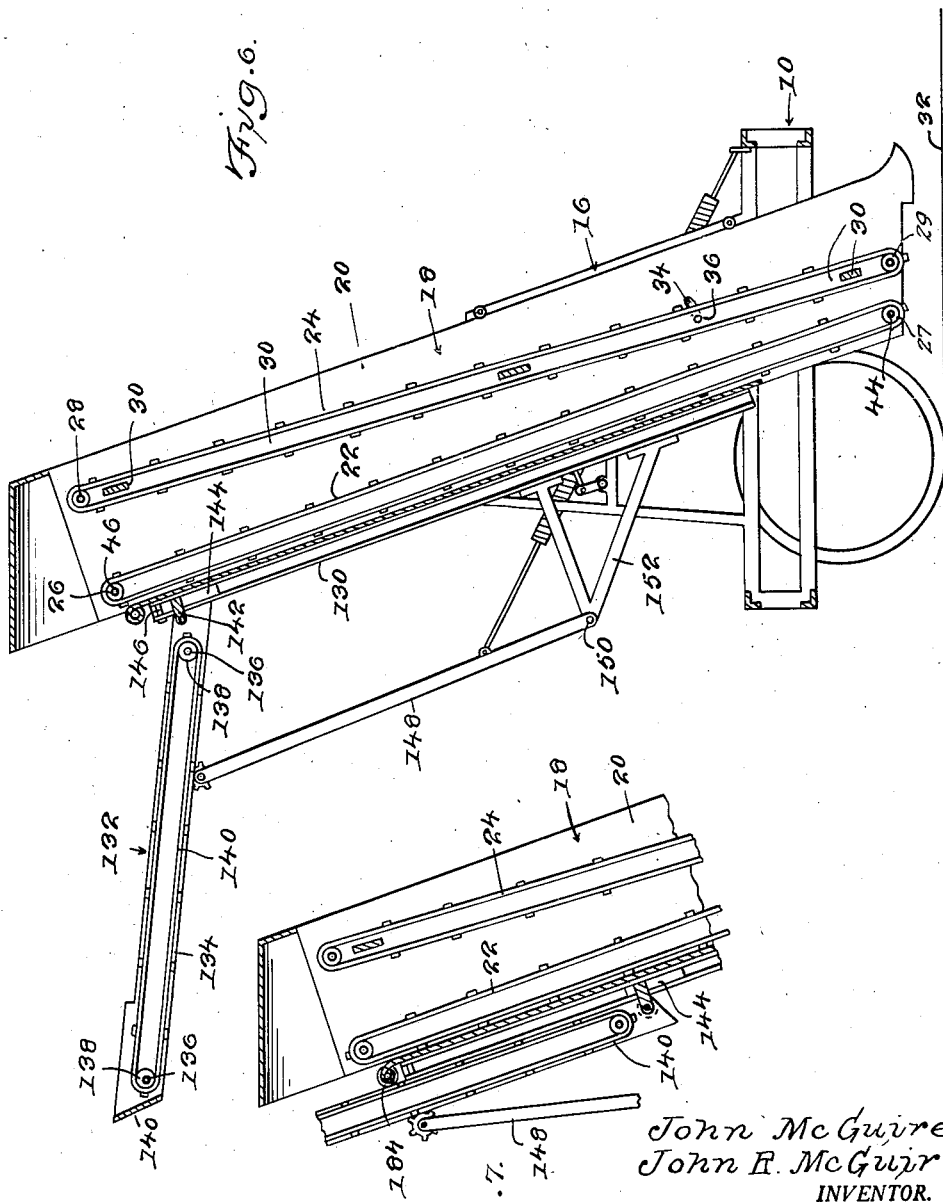

Patented Aug. 4, 1942

2,292,280

UNITED STATES PATENT OFFICE 2,292,280

RAKE LOADER

John McGuire and John R. McGuire,
Los Angeles, Calif.

Application September 29, 1941, Serial No. 412,866

2 Claims. (Cl. 56—345)

Our invention relates to rake loaders, and has among its objects and advantages the provision of an improved loader embodying means for collecting a relatively wide swath of hay and the like designed to converge the collected material into pickup proximity with the lower end of an elevating conveyor, together with novel means for conveying material from the upper end of the elevator mechanism to a point where it may be dropped into a suitable receptacle.

In the accompanying drawings:

Figure 1 is a side elevational view of a rake loader in accordance with our invention, with certain portions broken away for the purpose of illustration;

Figure 2 is a similar view but illustrating the horizontal take-off conveyor in position at the upper end of the elevator mechanism, in distinction to the illustration of Figure 1 wherein the horizontal conveyor is positioned adjacent to the elevator for storage and transportation purposes;

Figure 3 is a rear elevational view;

Figure 4 is a front elevational view;

Figure 5 is a view taken from the position indicated by line 5—5 of Figure 1;

Figure 6 is a vertical sectional view of the elevator;

Figure 7 is a vertical sectional view of the upper end of the elevator and a portion of the horizontal conveyor;

Figure 8 is a view taken from the position indicated by line 8—8 of Figure 2;

Figure 9 is a sectional view taken along the line 9—9 of Figure 8; and

Figure 10 is a sectional detail view of one of the rake tine unit adjusting guides.

In the embodiment selected for illustration, we make use of a lower frame 10 mounted on axles 12 on each of which is mounted a supporting wheel 14. Upon the frame 10 is mounted an upright frame 16 which supports an elevator 18 inclined slightly to the vertical. Elevator 18 comprises spaced side walls 20 between which are mounted two endless belts or canvases 22 and 24. The canvas 22 operates on rollers 26 and 27, while the canvas 24 operates on rollers 28 and 29 in association with a frame 30. Canvas 24 together with its frame 30 pivots about the axis of the roller 28 and normally converges slightly in the direction of the lower end of the canvas 22.

The lower ends of both canvases 22 and 24 lie in a common plane slightly in advance of the wheels 14 and a short distance above the ground surface 32. Each side wall 20 is provided with a slot 34 through which a stop pin 36 attached to the side of the frame 30 extends. Thus the stop pins 36 normally hold the canvas 24 in the position of Figure 6, but the canvas 24 may pivot from the canvas 22 to accommodate large bunches of material being elevated.

A rake tine unit 38 is carried by the frame 10. In Figure 5, the unit 38 comprises a semicircular frame 40 encircling the lower end of the elevator 18. To the frame 40 is secured rake tines 42 also arranged to define a portion of a circle so as to collect hay or other material in a relatively wide swath and converge the collected material in and about the lower end of the elevator 18 to be elevated therein through the medium of the two belts 22 and 24.

The shaft 44, to which the roller 27 is keyed, is rotatably journaled in the side walls 20. The shaft 46, to which the roller 26 is keyed, is also rotatably journaled in the side walls and is provided with a grooved wheel 48 for connection with a crossed V belt 50 passing over a grooved wheel 52 attached to the shaft 54 to which the roller 28 is keyed. Shaft 54 is also rotatably journaled in the side walls 20. A second grooved wheel 56 is attached to the shaft 46 for connection with a V belt 58 passing around a grooved wheel 60 secured to a shaft 62 rotatably mounted on the frame 16. A second grooved wheel 64 is attached to the shaft 62 for connection with a crossed V belt 66 passing around a grooved wheel 68 on a shaft 70 rotatably mounted on the frame 10. Means for driving the shaft 70 comprises a sprocket 72 connected with a chain 74 passing around a sprocket 76 attached to one of the axles 12. Proper tension is maintained in the belt 58 by a belt tightener 78 pivotally mounted on the frame 16 and biased against the belt by a tension spring 80.

In Figure 5, a rear wall 82 is secured to the side walls 20 and is extended beyond the side walls to provide flanges 84 slidably guided in channels 86 comprising members of the frame 16. Rollers 88 are mounted on the members 90 of the frame 16 for engagement with the forward edges of the side walls 20. Thus the elevator 18 may be adjusted vertically relatively to the frame 16.

Bell cranks 92 are pivotally connected at 94 to frame members 96 located on opposite sides of the frame 16. Since both bell cranks and their associated structure are identical, the description of one will apply to both. One arm of the bell crank is provided with an elongated loop 98 loosely receiving a pin 100 on one of the side walls 20. The other arm of the bell crank is pivotally connected with one end of a link 102 having its other end pivotally connected with a lever 104 secured to a rotary shaft 106 mounted on the frame member 96. To the free end of one of the levers 104 is pivotally connected one end of a link 108 having its other end pivotally connected with a lever 110. Thus the bell crank 92 may be pivoted through manipulation of the lever 110 for imparting vertical adjustment to the elevator 18 to the end that the lower end of the elevator may be properly adjusted to the ground surface with respect to the character of the material being handled.

Two opposite sides of the frame 10 are provided with guides 112 which slidably support blocks 114 to which the frame 40 of the rake tine unit is fixedly secured. One block 114 on each side of the frame is provided with an elongated eye 116 for the loose reception of a pin 118 at one end of a bell crank 120 fixed to a shaft 122 rotatably mounted on the frame 10. To the other end of one of the bell cranks 120 is pivotally connected a link 124 having its other end pivotally connected with a lever 126 so that the rake tine unit may be adjusted vertically through manipulation of the lever 126.

Figure 10 illustrates a specific construction of one of the guides 112. The block 114 includes an arm 125 slidable through an opening 127 in the guide 112, this arm being provided with the pin 118 which connects with the eye 116. The remaining two guides 112 and their respective blocks 114 are of the same construction with the exception that they are devoid of a bell crank connection. The blocks 114 are slidably guided in slots 128. Thus the rake tine unit may be adjusted independently of the elevator and relatively to the ground surface.

Referring to Figure 5, two channels 130 are secured to the back wall 82, these channels opening in the direction of each other and extending in parallelism upwardly of the wall. In the channels 130 is slidably mounted the lower end of a horizontal conveyor 132. This conveyor comprises side walls 134 in which are rotatably journaled shafts 136 to which are keyed rollers 138 supporting an endless belt 140. The forward ends of the walls 134 are interconnected by a wall 140 and the rear ends of the walls are interconnected by a bar 142 having blocks 144 at its ends slidable in the channels 130. The bar 142 is pivotally connected with the side walls 134, and each channel 130 is provided with a stop 146 at its upper end engageable by one of the blocks 144 to prevent that block from sliding beyond the position shown in Figure 6.

Normally the horizontal conveyor 132 lies in the position of Figure 1 adjacent the rear wall 82. Means for moving the conveyor 132 from its position of Figure 1 to that illustrated in Figures 2 and 7 comprises a frame 148 pivotally connected at its lower end with a shaft 150 rotatably journaled in frame members 152 secured to the channels 130. One end of the shaft 150 is provided with a crank 154 and is provided with a sprocket 156 for driving a chain 158 passing around a sprocket 160 keyed to a shaft 162 rotatably journaled in the upper end of the frame 148. Two gears 164 are keyed to the shaft 162 and mesh with rakes 166 secured to the side walls 134. Thus rotation of the crank 154 imparts movement to the chain 158 for rotating the gears 164.

With the conveyor 132 positioned according to Figure 1, counter-clockwise rotation of the gears 164, best illustrated in Figure 3, elevates the conveyor 132 in the channels 130 to the position where the blocks 144 engage the stops 146. At the same time, the frame 148 pivots from the position illustrated in Figure 1 to that illustrated in Figure 2, so that the conveyor 132 is supported in the position shown in Figures 2 and 6.

To each side of the frame 148 is connected a tension spring 168, these springs being connected with the frame 10. Chain tighteners 170 are mounted on the frame 148 for the chain 158. To each side wall 134 is connected a link 172 pivotally connected at 174 with a link 176 pivotally connected at 178 with one of the side walls 20. The links 172 are in the nature of elbows, and each link has one end of a tension spring 180 connected therewith, the opposite end of the tension spring being connected with the respective link 176. Means for driving the belt or canvas 140 of the conveyor 132 comprises a grooved wheel 182 keyed to one of the shafts 136. Wheel 182 engages one run of the belt 158. While the grooved wheel 182 lies in the plane of the grooved wheels 56 and 60 in the nested position of the conveyor 132, as illustrated in Figure 1, the belt tightener 78 is yieldable so that the belt 158 may be distorted from the position of Figure 1 to that illustrated in Figure 2 to accommodate the shifted position of the grooved wheel 182. Rollers 184 are mounted on the rear wall 82 for engagement with the side walls 134 of the conveyor 132 when descending or arising relatively to the rear wall.

We provide a rake loader wherein the conveyor 132 may be closely nested with respect to the elevator 18 to facilitate transportation from place to place as well as conservation of space when in storage. In addition, the rake tine unit is so formed as to collect the material in an exceptionally wide swath and converge the material into pickup relationship with the lower end of the elevator. Both the elevator and the rake tine unit are adjustably mounted so as to permit precise adjustment under variable operating conditions.

The conveyor is particularly adapted to pusher service, as when secured to the forward end of a tractor or suitable truck. A beam structure 186 may be bolted to a mount 188 secured to the frame 10, which beam structure may be attached to the propelling vehicle. Under such conditions, the conveyor 132 will convey the material over the propelling vehicle and drop the material into the truck- or tractor-drawn receptacle. A third wheel 190 is illustrated in association with the forward end of the frame 10. This wheel may be adjusted for elevation but in connection with the tractor- or truck-driven hookups. We prefer to eliminate the third wheel 190, since the frame 10 will be secured to the propelling vehicle so as to balance the frame 10 upon the supporting wheels 14.

Rollers 192 are mounted at the ends of the shaft 194 which pivotally connects the side walls 134 with the bar 142. The rollers 192 engage the channels 130, particularly when the conveyor 132 is pivoting to its horizontal position so as to facilitate pivotal movement thereof.

A hood 194 is attached to the side walls 20 at the delivery end of the belts 22 and 24. Springs 196 connect with the bell cranks 92 and the frame 16 to aid in lifting the elevator 18.

Without further elaboration, the foregoing will so fully illustrate our invention, that others may, by applying current knowledge, readily adapt the same for use under various conditions of service.

We claim:

1. A rake loader comprising a supporting frame, an upright elevator structure mounted on said frame and comprising in part two endless belts, a rake tine unit mounted on said frame for raking material in and about the lower end of said elevator structure to be picked up by said belts, a drive means for said belts comprising in part an endless flexible member, a horizontal conveyor normally lying in an upright position adjacent said elevator structure and comprising in part a third belt, sliding pivot means for one end of said horizontal conveyor, a drive means for said third belt located at said one end of the horizontal conveyor and operatively engaging said endless flexible means, a rack on said horizontal conveyor, a pivoted gear means engaging said rack for elevating the horizontal conveyor, and means guiding the horizontal conveyor from its upright position to a horizontal position at the upper end of said elevator structure.

2. The invention described in claim 1 wherein one of said two endless belts is pivotally mounted to the elevator structure at its upper end and arranged to pivot toward and away from the other of the two endless belts.

JOHN McGUIRE.
JOHN R. McGUIRE.